United States Patent [19]
Jinno

[11] Patent Number: 5,354,074
[45] Date of Patent: Oct. 11, 1994

[54] METAL GASKET HAVING FIRST AND SECOND DIVERSELY VULCANIZED COATINGS

[75] Inventor: Osamu Jinno, Nagoya, Japan

[73] Assignee: Taiho Kogyo Co., Ltd., Toyota, Japan

[21] Appl. No.: 995,969

[22] Filed: Dec. 23, 1992

[30] Foreign Application Priority Data

Dec. 27, 1991 [JP] Japan .................. 3-359037

[51] Int. Cl.$^5$ .............................. F16J 15/10
[52] U.S. Cl. ............... 277/235 A; 277/235 B; 277/DIG. 6
[58] Field of Search ........... 277/1, 233, 235 A, 235 B, 277/DIG. 6

[56] References Cited

U.S. PATENT DOCUMENTS

| | | |
|---|---|---|
| 3,970,322 | 7/1976 | Stecher et al. ............ 277/235 B X |
| 4,169,185 | 9/1979 | Bhatia .................... 277/235 B X |
| 4,196,162 | 4/1980 | Stichter ..................... 277/1 X |
| 4,394,205 | 7/1983 | Blenner . |
| 4,681,800 | 7/1987 | Zerfass et al. ............ 277/235 B X |
| 4,720,316 | 1/1988 | Ruoff .................... 277/235 B X |
| 5,110,630 | 5/1992 | Abe et al. ............... 277/235 B X |
| 5,122,214 | 6/1992 | Zurfluh et al. ........... 277/235 A X |

FOREIGN PATENT DOCUMENTS

| | | |
|---|---|---|
| 61-41960 | 3/1986 | Japan . |
| 1146064 | 10/1989 | Japan . |
| 227217 | 9/1990 | Japan . |
| 2227217 | 9/1990 | Japan . |
| 83975 | 3/1992 | Japan . |

OTHER PUBLICATIONS

Patent Abstracts of Japan, vol. 14, No. 536, JP-A-22 27 217, Sep. 10, 1990.
Patent Abstracts of Japan, vol. 16, No. 302, JP-A-40 83 975, Mar. 17, 1992.

*Primary Examiner*—William A. Cuchlinski, Jr.
*Assistant Examiner*—Scott W. Cummings
*Attorney, Agent, or Firm*—Sughrue, Mion, Zinn, Macpeak & Seas

[57] ABSTRACT

A metal gasket having a base plate and coating layers deposited thereon. A first coating layer (10) having a first vulcanizing agent is deposited on a metallic base plate (1). A second coating layer (20) is deposited on the first coating layer (10) and has a second vulcanizing agent. The first coating layer (10) and the second coating layer (20) are vulcanized with different vulcanized rates from each other. For instance, a cold type vulcanizing coating layer, which is vulcanized at an ordinary temperature, and a hot type vulcanizing coating layer, which is vulcanized at a higher temperature than the ordinary temperature, are formed, and heated at a predetermined temperature to vulcanize only the former, so that two layers having different vulcanized rates from each other are formed to provide a vulcanized layer and an unvulcanized layer on the base plate.

6 Claims, 3 Drawing Sheets

METAL GASKET HAVING FIRST AND SECOND DIVERSELY VULCANIZED COATINGS

BACKGROUND OF THE INVENTION

1. Field of the Invention

The present invention relates to a method of manufacturing a metal gasket, and more particularly to a method of manufacturing a metal gasket having a metallic base plate and coating layers deposited thereon, and disposed between a cylinder head and a cylinder block of an internal combustion engine.

2. Description of the Related Art

It has been well known that a gasket is disposed between connecting members so as to seal a clearance therebetween. For instance, between a cylinder head and a cylinder block of an internal combustion engine, a cylinder head gasket is disposed. With respect to this gasket, a metal gasket formed of a metallic plate has been noted, nowadays. For example, Japanese Utility model Laid-Open Publication No. 61-41960 discloses a metal gasket which has a metallic plate with a vulcanized first coating layer deposited thereon and a non-vulcanized second coating layer deposited on the first coating layer to provide two coating layers. Also, Japanese Utility model Laid-Open Publication No. 1-146064 discloses a metal gasket having a base plate, on which an unvulcanized coating layer including a vulcanizing agent is deposited. In the latter publication, a soft coating layer which contains no vulcanizing agent is defined as a non-vulcanized coating layer, and the one which contains the vulcanizing agent but which has not been vulcanized, is defined as an unvulcanized coating layer. Also, in the Publication No. 61-41960, terminologies of "vulcanized" and "non-vulcanized" are defined in the same meaning as defined above.

In Japanese Patent Laid-Open Publication No. 2-227217, it has been pointed out that the connecting force between the vulcanized rubber layer and non-vulcanized rubber layer of the metal gasket disclosed in the Publication No. 61-41960 is weak so that the layers might be separated, and that the manufacturing process is complicated and takes a long time, and therefore a method to solve the foregoing problems has been proposed. That is the method of forming a vulcanizing agent layer containing a vulcanizing agent on a surface of a base material, then forming further a non-vulcanized rubber layer on the vulcanizing agent layer, and vulcanizing the non-vulcanized rubber layer to form a vulcanized rubber layer with a vulcanized rate which is decreased from the surface of the base material to the surface of the rubber layer.

In this publication No. 1-146064, it has been pointed out that the metal gasket having the vulcanized first coating layer and the non-vulcanized second coating layer deposited thereon as disclosed in the publication No. 61-41960 has such a problem that the non-vulcanized layer will be flown out to impair a sealing property, and therefore it has been proposed that the unvulcanized coating layer is deposited to satisfy the requirements of the sealing property and durability at the same time. However, the unvulcanized coating layer will be heated and hardened gradually after the gasket was clamped between the connecting members, so that the layer may not obtain a sufficient sealing effect depending upon the vulcanizing agent contained in the unvulcanized coating layer.

As for the vulcanizing agent, there is known that of a cold type which accelerates a vulcanization at an ordinary temperature or room temperature, and also that of a hot type which accelerates the vulcanization at a higher temperature than the ordinary temperature, for example. If the vulcanizing agent contained in the unvulcanized coating layer is of the former type, i.e., the cold type vulcanizing agent, the unvulcanized layer will be vulcanized in an ordinary storing condition of a metal gasket in accordance with a lapse of time after it was manufactured, so that the unvulcanized coating layer will be hardened to impair its sealing effect. Therefore, it is not appropriate to store the metal gasket for a long period of time. As a countermeasure, it will be necessary to store it in a low temperature room. Whereas, if the hot type vulcanizing agent is employed, the above-described problem about the unvulcanized coating layer will be solved, but it will be necessary to heat the layer at a temperature which is higher than the temperature at which the layer having the cold type vulcanizing agent is vulcanized, so that a large energy will be consumed to raise a manufacturing cost.

On the other hand, according to a method recited in the publication 2-227217, the vulcanizing agent in the vulcanizing agent layer is spreading and combined to form the vulcanized rubber layer, so that the sealing property and durability will be obtained and the manufacturing process will be simplified. However, the spreading of the vulcanizing agent into the non-vulcanized rubber layer is dependent on various factors such as the thickness of the vulcanizing agent layer, the temperature or the like, so that it is not necessarily easy to make uniform the spreading in each metal gasket. Consequently, a dispersion in a distribution within the vulcanized rubber layer will be caused among the products to make it difficult to ensure a certain quality of each product.

SUMMARY OF THE INVENTION

It is, therefore, an object of the present invention to provide a method of manufacturing a metal gasket depositing a first coating layer and a second coating layer on a base plate, and enabling vulcanized rates in the coating layers to be adjusted appropriately and easily.

It is another object of the present invention to provide a method of manufacturing a metal gasket by forming a vulcanized coating layer on a base plate, and then depositing an unvulcanized coating layer on the vulcanized coating layer with little consumption of energy to manufacture the metal gasket at a low cost.

In accomplishing these and other objects, a method of manufacturing a metal gasket comprises the steps of depositing a first coating layer having a first vulcanizing agent on a metallic base plate, depositing a second coating layer having a second vulcanizing agent on the first coating layer, and vulcanizing the first coating layer and second coating layer with different vulcanized rates from each other.

In the above method, it is preferable that one of the first vulcanizing agent and second vulcanizing agent is a cold type vulcanizing agent which accelerates a vulcanization at an ordinary temperature, and the other of the first vulcanizing agent and second vulcanizing agent is a hot type vulcanizing agent which accelerates the vulcanization at a higher temperature than the ordinary temperature, and that the first coating layer and second coating layer are deposited on the base plate and heated at a predetermined temperature to vulcanize the first coating layer and second coating layer with different vulcanized rates from each other.

The method of manufacturing a metal gasket may comprise the steps of depositing a cold type vulcanizing coating layer which is vulcanized at an ordinary temperature, heating the cold type vulcanizing coating layer to form a vulcanized layer, and depositing on the vulcanized layer a hot type vulcanizing coating layer which is vulcanized at a higher temperature than the ordinary temperature, to form an unvulcanized layer (which has not been heated at the higher temperature).

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 8:
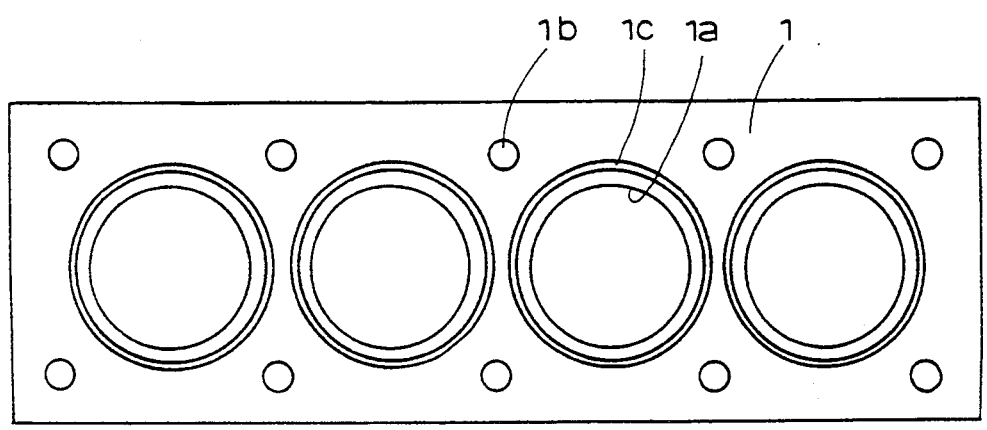
FIG. 8 is a plan view of an embodiment of a metal gasket manufactured by a method according to the present invention.

Referring to FIG. 8, there is illustrated a cylinder head gasket clamped between a cylinder head and a cylinder block of a multicylinder internal combustion engine, as an embodiment of a metal gasket manufactured by a method according to the present invention. The gasket comprises a base plate 10 made of a flat elastic metal, e.g., stainless steel (SUS) having a plurality of openings defined therein, including combustion openings 1a, bolt holes 1b, coolant openings (not shown), oil openings (not shown), and the like. In addition, annular beads 1c may be formed around the respective combustion openings 1a. Then, a vulcanized coating layer, unvulcanized coating layer and the like are formed in accordance with the following method. In this respect, a non-vulcanized coating layer means a coating layer which contains no vulcanizing agent, whereas the unvulcanized coating layer means a coating layer which contains a vulcanizing agent, but has not been vulcanized.

Figure 1:
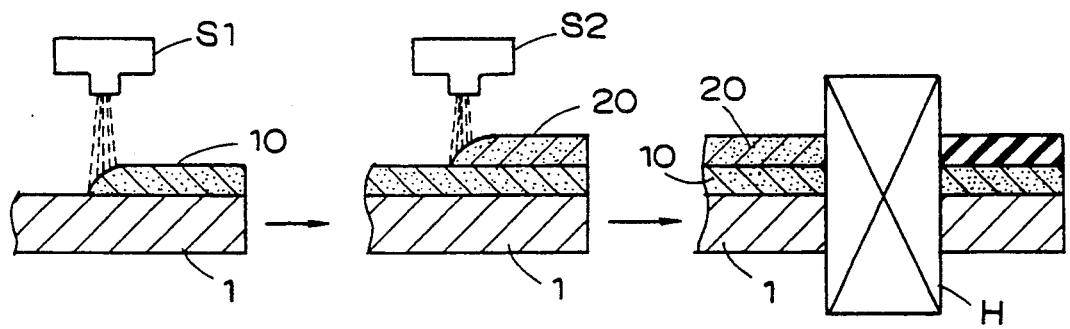
FIG. 1 is a diagram of an essential part of a manufacturing process of a metal gasket according to a first embodiment of the present invention.

FIG. 1 illustrates an essential part of steps in a method of manufacturing the metal gasket according to a first embodiment of the present invention, wherein a first coating layer 10 is deposited on the base plate 1 in a first step, and a second coating layer 20 is deposited on the first coating layer 10 in a second step. Then, after the base plate 1 is dried, it is heated in a furnace H to vulcanize the first and second coating layers 10, 20. In this respect, the first coating layer 10 is made of a hot type vulcanizing coating layer which is applied on the base plate 1 by a feeder S1, and which includes, for example, a fluoro rubber (100 per) and more than a vulcanizing equivalent (e.g., 5 per) of a hot type vulcanizing agent, which accelerates a vulcanization at a higher temperature than an ordinary temperature, e.g., a polyol vulcanizing agent. The vulcanizing equivalent means the amount of vulcanizing agent which is required to vulcanize and harden the fluoro rubber. Whereas, the second coating layer 20 is made of a cold type vulcanizing coating layer which is applied on the first coating layer 10 by a feeder S2, and which includes the fluoro rubber and the vulcanizing equivalent of a cold type vulcanizing agent, which accelerates the vulcanization at the ordinary temperature or room temperature, e.g., an amine or peroxide vulcanizing agent.

Figure 4:
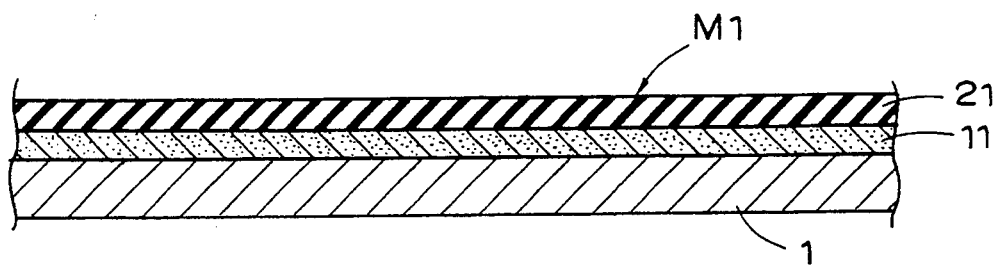
FIG. 4 is a sectional view of a part of an embodiment of a metal gasket manufactured by a method according to the present invention.

Then, the base plate 1 is heated in the furnace H at a temperature which is lower than a temperature at which the first coating layer 10 having the hot type vulcanizing agent is vulcanized, and higher than a temperature at which the second coating layer 20 having the cold type vulcanizing agent is vulcanized. Consequently, an unvulcanized layer 11 having the hot type vulcanizing agent is formed on the base plate 1, and further a vulcanized layer 21 is formed on the unvulcanized layer 11 to produce a metal gasket M1 as shown in FIG. 4. The cold type vulcanizing agent generally accelerates the vulcanization at a room temperature. The cold type vulcanizing agent according to the present invention includes the one which substantially accelerates the vulcanization at a temperature lower than 30° C. to 70° C. On the other hand, the hot type vulcanizing agent does not actually accelerate the vulcanization at the room temperature, but accelerates the vulcanization when it is heated at a temperature higher than 100° C. When the cold type vulcanizing agent is employed and heated, the vulcanization is accelerated rapidly by increasing the temperature.

Figure 5:
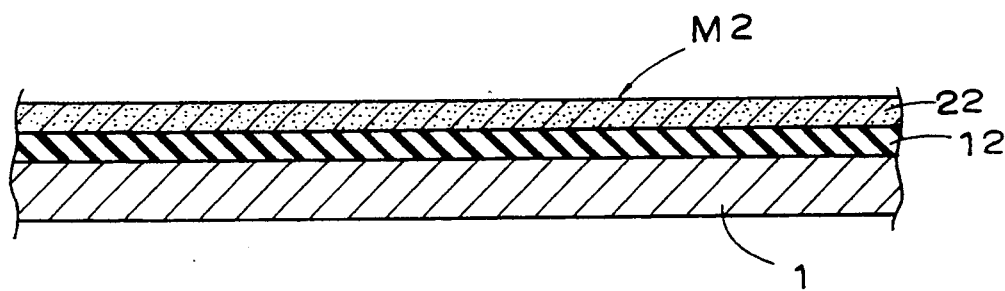
FIG. 5 is a sectional view of a part of another embodiment of a metal gasket manufactured by a method according to the present invention.

In the first embodiment, the first coating layer 10 may be made of the cold type vulcanizing coating layer which has the fluoro rubber and the vulcanizing equivalent of the cold type vulcanizing agent, and the second coating layer 20 may be made of the hot type vulcanizing coating layer which has the fluoro rubber and more than the vulcanizing equivalent of the hot type vulcanizing agent, and then the layers 10, 20 may be heated at a temperature higher than the temperature at which the cold type vulcanizing coating layer is vulcanized. In this case, a vulcanized layer 12 is formed on the base plate 1 as shown in FIG. 5, and an unvulcanized layer 22 having the hot type vulcanizing agent is formed on the vulcanized layer 12 to produce a metal gasket M2. In this respect, the unvulcanized layer may be formed to be a partially vulcanized layer which became vulcanized partially by adjusting the temperature or the heating time period.

Figure 2:
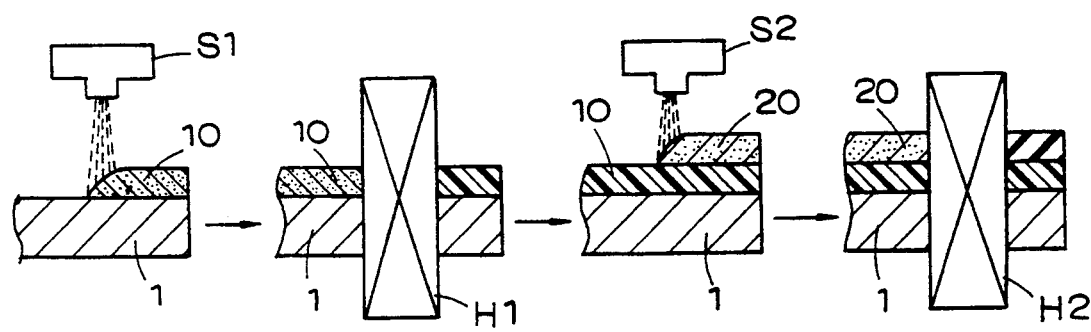
FIG. 2 is a diagram of an essential part of a manufacturing process of a metal gasket according to a second embodiment of the present invention.

FIG. 2 illustrates an essential part of steps in a method of manufacturing the metal gasket according to a second embodiment of the present invention, wherein the first coating layer 10 is deposited on the base plate 1 in a first step, and heated in the furnace H1 to be vulcanized in a second step. Then, the second coating layer 20 is deposited on the first coating layer 10 in a third step, and heated in the furnace H2 to be vulcanized in a fourth step.

Figure 6:
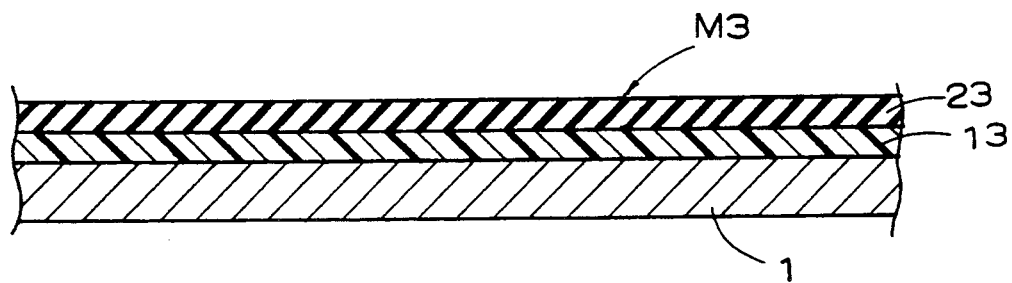
FIG. 6 is a sectional view of a part of a further embodiment of a metal gasket manufactured by a method according to the present invention.

If the first coating layer 10 is made of the hot type vulcanizing coating layer which has the fluoro rubber and less than the vulcanizing equivalent of the hot type vulcanizing agent, and the second coating layer 20 is made of the cold type vulcanizing coating layer which has a fluoro rubber and more than the vulcanizing equivalent of the cold type vulcanizing agent, and then the layers 10, 20 are heated at a temperature as high as it is possible to vulcanize the layers 10, 20 respectively, a metal gasket M3 as shown in FIG. 6 will be produced. That is, in lieu of the unvulcanized layer 11 of the hot type vulcanizing layer as shown in FIG. 4, a partially vulcanized layer 13 is formed, and then a vulcanized layer 23 is formed on the layer 13. The partially vulcanized layer 13 has been vulcanized different from the unvulcanized layer to have a durability preventing its flow, and maintains its softness different from the vulcanized layer to ensure a sealing property, even if it became vulcanized.

Figure 7:
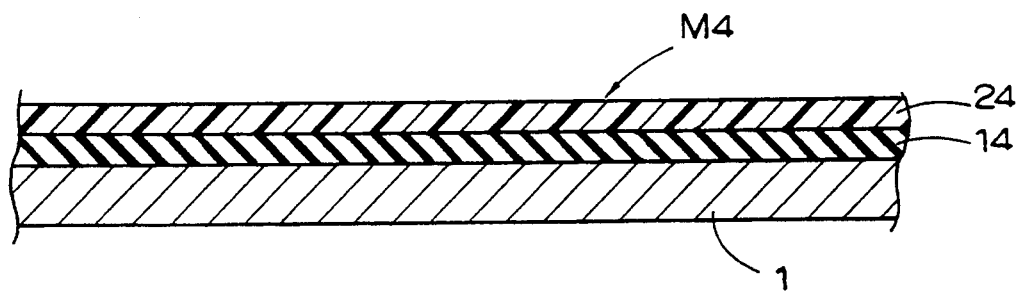
FIG. 7 is a sectional view of a part of yet another embodiment of a metal gasket manufactured by a method according to the present invention.

Reversely, if the first coating layer 10 is made of the coating layer having the vulcanizing equivalent of the cold type vulcanizing agent, and the second coating layer 20 is made of the coating layer having less than the vulcanizing equivalent of the hot type vulcanizing agent, and then the layers 10, 20 are heated at a temperature as high as it is possible to vulcanize the layers 10, 20 respectively, a vulcanized layer 14 and a partially vulcanized layer 24 are formed to produce a metal gasket M4 as shown in FIG. 7. Thus, the heating process may be made twice. In this case, the cold type vulcanizing coating layer may be heated at a temperature lower than the temperature at which the hot type vulcanizing coating layer is heated.

With respect to the metal gaskets M3, M4 as shown in FIGS. 6 and 7, if the coating layer having the fluoro rubber and less than the vulcanizing equivalent of the hot type vulcanizing agent is used for the first coating layer 10 or the second coating layer 20 in the first embodiment of the method described before, in lieu of the coating layer having the fluoro rubber and more than the vulcanizing equivalent of the hot type vulcanizing agent, and then the layers 10, 20 are heated at a temperature higher than the temperature at which the hot type vulcanizing coating layer is vulcanized, the same structures will be formed.

Figure 3:
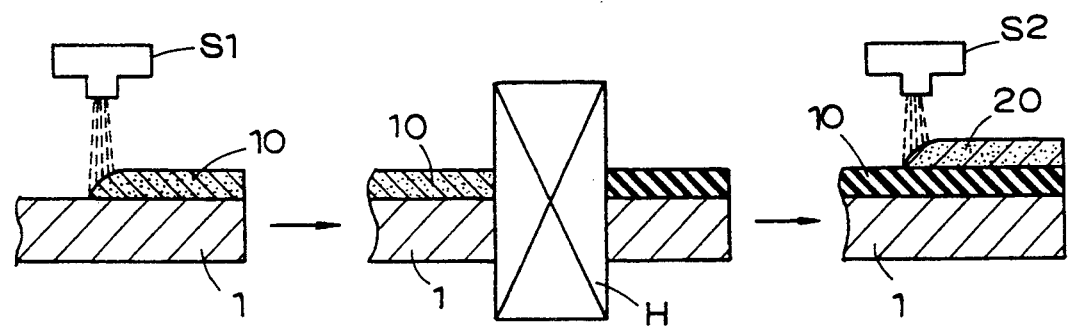
FIG. 3 is a diagram of an essential part of a manufacturing process of a metal gasket according to a third embodiment of the present invention.

FIG. 3 illustrates an essential part of steps in a method of manufacturing a metal gasket according to a third embodiment of the present invention, wherein deposited on the base plate 1 is the cold type vulcanizing coating layer having the fluoro rubber and the vulcanizing equivalent of the cold type vulcanizing agent to form the first coating layer 10 in a first step, and the same is heated in the furnace H to be vulcanized in a second step, and deposited on the first coating layer 10 is the hot type vulcanizing coating layer having a fluoro rubber and more than the vulcanizing equivalent of the hot type vulcanizing agent to form the second coating layer 20 in a third step. In the present embodiment, it is enough to heat the layers 10, 20 at a temperature as low as it is possible to vulcanize the cold type vulcanizing coating layer, so that the layers 10, 20 may be heated at a lower temperature than the prior method for vulcanizing the hot type vulcanizing coating layer. Therefore, the electric power consumed in the furnace H is reduced comparing with the prior method. According to the present embodiment, the metal gasket M2 as shown in FIG. 5 is produced. In lieu of the second coating layer, may be deposited a coating layer having the fluoro rubber and less than the vulcanizing equivalent of the hot type vulcanizing agent.

In order to ascertain the effects of the above-described embodiments, the following experiments were made. At the outset, in accordance with the method of the first embodiment of the present invention, the metal gasket M2 as shown in FIG. 5 was made as follows. Namely, a stainless steel plate was employed for the base plate 1 and washed to be degreased. 5 per (by weight, in terms of vulcanizing equivalent) of the amine vulcanizing agent of the cold type vulcanizing agent was added to 100 per fluoro rubber, and these were applied to the base plate 1 and dried to form a 10 micron thick coating layer on the base plate 1. Next, 10 per of the polyol vulcanizing agent of the hot type vulcanizing agent was added to 100 per fluoro rubber, and these were applied to the coating layer formed on the base plate 1, and dried to form a coating layer of 20 micron thick in total. Then, the base plate 1 having the layers deposited thereon was heated to be vulcanized at 130° C. for 3 hours to produce the metal gasket M2.

Also, in accordance with the third embodiment of the present invention, after the cold type vulcanizing coating layer of the first embodiment was deposited on the base plate 1, the base plate 1 having the layer was heated to be vulcanized at 130° C. for 3 hours, and the hot type vulcanizing coating layer was applied to the layer, and then dried to produce the metal gasket M2 as shown in FIG. 5.

In comparison with the above-described embodiments, comparative examples of metal gaskets were manufactured in accordance with methods of the following 6 examples:

EXAMPLE 1

5 per cold type vulcanizing agent, in terms of the vulcanizing equivalent, was added to 100 per fluoro rubber, and these were applied to a stainless steel base plate and dried to form a 10 micron thick coating layer. On this coating layer, a fluoro rubber having no vulcanizing agent was applied and dried to form a 10 micron thick unvulcanized coating layer. Then, the plate was heated to be vulcanized in the furnace at 130° C. for 3 hours to produce a metal gasket having a vulcanized layer and an unvulcanized layer deposited on the base plate.

EXAMPLE 2

10 per hot type vulcanizing agent was added to the fluoro rubber, and these were applied to the stainless steel base plate and dried to form a 10 micron thick coating layer. On this coating layer, the fluoro rubber having no vulcanizing agent was applied and dried to form a 10 micron thick unvulcanized coating layer. Then, the plate was heated to be vulcanized in the furnace at 190° C. for 5 hours to produce a metal gasket having a vulcanized layer and an unvulcanized layer deposited on the base plate.

EXAMPLE 3

5 per cold type vulcanizing agent was added to the fluoro rubber, and these were applied to the stainless steel base plate and dried to form a 20 micron thick coating layer. Then, the plate was heated to be vulcanized in the furnace at 130° C. for 3 hours to produce a metal gasket having a vulcanized layer deposited on the base plate.

EXAMPLE 4

10 per hot type vulcanizing agent was added to the fluoro rubber, and these were applied to the stainless steel base plate and dried to form a 20 micron thick coating layer. Then, the plate was heated to be vulcanized in the furnace at 190° C. for 5 hours to produce a metal gasket having a vulcanized layer deposited on the base plate.

EXAMPLE 5

5 per cold type vulcanizing agent was added to the fluoro rubber, and these were applied to the stainless steel base plate and dried to form a 10 micron thick coating layer. Then, the plate was heated to be vulcanized in the furnace at 130° C. for 3 hours. After vulcanizing it, the fluoro rubber having 5 per cold type vulcanizing agent was deposited as it was to produce a metal gasket having an unvulcanized layer deposited on the base plate.

EXAMPLE 6

10 per hot type vulcanizing agent was added to the fluoro rubber, and these were applied to the stainless steel base plate and dried to form a 10 micron thick coating layer. Then, the plate was heated to be vulcanized in the furnace at 190° C. for 5 hours. After vulcanizing it, the fluoro rubber having 10 per hot type vulcanizing agent was deposited as it was to produce a metal gasket having an unvulcanized layer deposited on the base plate.

With respect to the metal gaskets of the embodiments and examples manufactured as described above, sealing tests were made by a sealing testing machine of a static pressure type using a high pressure gas and pressurized water. At the outset, a cylinder head and a cylinder block of an internal combustion engine were installed on the sealing testing machine, and each metal gasket of the embodiments and examples was disposed between the cylinder head and cylinder block, and then leaks of the gas and water were examined as an initial sealing test. Next, after a 300 hour endurance test was made on each metal gasket of the embodiments and examples disposed between the cylinder head and cylinder block, the sealing test was made again by the sealing testing machine as a post-endurance sealing test.

As for the examples 1 and 2, no problem was caused in the initial sealing test, but a little leak of gas was observed due to a flow of the unvulcanized layer in the post-endurance sealing test. As for the examples 3 and 4, leaks of both gas and water were observed in the initial sealing test. Therefore, the endurance test could not be made, so that the post-endurance sealing test was not made. On the contrary, as for the metal gasket M2 manufactured in accordance with the methods of the first and third embodiments, the results of both sealing tests were good without causing any flow of the coating layers, and satisfactory results were obtained in both durability and sealing property.

As for the example 5, the initial sealing test was made on the metal gasket which was left for 5 days as it was after it was produced. The result was that the unvulcanized layer got vulcanized to be hardened, so that the sealing property was insufficient. As for the example 6, the results of the initial sealing test and post-endurance test were satisfactory. However, the consumption of the electric power were larger than that in the third embodiment of the present invention, because the gasket had to be heated at a high temperature when vulcanized. On the contrary, in the third embodiment, the consumption of the electric power was small and the results of both tests were satisfactory in both sealing property and durability.

Accordingly, when the metal gaskets M2, M4 produced by the methods of the embodiments of the present invention are disposed between the connecting members, e.g., the cylinder head and cylinder block, and clamped by a certain clamping force, the unvulcanized layer 22 and partially vulcanized layer 24 formed on the base plate 1 as the second coating layers respectively will tightly contact the surfaces of the connecting members without being flown out, and any small roughness of the contacting surface will be absorbed by the second coating layers to provide a good sealing property.

According to the metal gaskets M1, M3 produced by the methods of the embodiments of the present invention, the unvulcanized layer 11 and partially vulcanized layer 13 forming the first coating layers are tightly adhered to the surface of the respective base plate 1, and the vulcanized layers 21, 23 forming the second coating layers are tightly adhered to the first coating layers respectively and hardened, so that if either the vulcanized layer 21 or 23 is deposited around the bead 1c of the base plate 1 as shown in FIG. 8 with a certain width, a sealing member will be formed around the bead 1c. Therefore, by this sealing member, the sealing property around the combustion opening 1a will be ensured, and the unvulcanized layer 11 or partially vulcanized layer 13 will be tightly adhered to the contacting surface without being flown out to absorb the small roughness of the contacting surface.

In the above-described embodiments, a coating layer is deposited on the surface of the base plate 1, whereas the coating layer may be formed after a primer was applied to the surface of the base plate 1. Or, the primer may be added to the first coating layer to thereby reduce a step of applying the primer to the base plate 1. Further, in view of productivity, it is preferable to deposit the second coating layer having the primer therein on the first coating layer.

It should be apparent to one skilled in the art that the above-described embodiments are merely illustrative of but a few of the many possible specific embodiments of the present invention. Many modifications may be made by those skilled in the art without departing from the spirit and scope of the invention as defined in the following claims.

What is claimed is:
1. A metal gasket comprising:
   a metallic base plate having at least one opening formed therein;
   a first coating layer having a first vulcanizing agent, said first coating layer being deposited on said base plate; and
   a second coating layer having a second vulcanizing agent, said second coating layer being deposited on said first coating layer, said second coating layer having a different vulcanization rate than a vulcanization rate of said first coating layer, so that said second coating layer is vulcanized at a rate different from the vulcanization rate at which said first coating layer is vulcanized.

2. A metal gasket as set forth in claim 1, wherein said first coating layer is an unvulcanized coating layer having a hot type vulcanizing agent therein which is vulcanized at a higher temperature than room temperature, and wherein said second coating layer is a vulcanized coating layer.

3. A metal gasket as set forth in claim 1, wherein said first coating layer is a vulcanized coating layer, and wherein said second coating layer is an unvulcanized coating layer having a hot type vulcanizing agent therein which is vulcanized at a higher temperature than room temperature.

4. A metal gasket as set forth in claim 1, wherein said first coating layer is a partially vulcanized coating layer, and wherein said second coating layer is a vulcanized coating layer.

5. A metal gasket as set forth in claim 1, wherein said first coating layer is a vulcanized coating layer, and wherein said second coating layer is a partially vulcanized coating layer.

6. A metal gasket as set forth in claim 4, wherein said first coating layer has less than a vulcanizing equivalent of a hot type vulcanizing agent therein which is vulcanized at a higher temperature than room temperature, to form a partially vulcanized coating layer.

* * * * *